(12) United States Patent
Chen (10) Patent No.: US 10,466,912 B2
(45) Date of Patent: Nov. 5, 2019

(54) OPERATION METHOD OF DISTRIBUTED MEMORY DISK CLUSTER STORAGE SYSTEM

(71) Applicant: Hsun-Yuan Chen, Taipei (TW)

(72) Inventor: Hsun-Yuan Chen, Taipei (TW)

(*) Notice: Subject to any disclaimer, the term of this patent is extended or adjusted under 35 U.S.C. 154(b) by 0 days.

(21) Appl. No.: 14/562,892

(22) Filed: Dec. 8, 2014

(65) Prior Publication Data
US 2015/0160872 A1 Jun. 11, 2015

(30) Foreign Application Priority Data
Dec. 9, 2013 (TW) ................................ 102145155

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .......... *G06F 3/0619* (2013.01); *G06F 3/0607* (2013.01); *G06F 3/067* (2013.01); *G06F 3/0631* (2013.01); *G06F 3/0665* (2013.01)

(58) Field of Classification Search
CPC .... G06F 3/0619; G06F 3/0607; G06F 3/0631; G06F 3/0665; G06F 3/067
See application file for complete search history.

(56) References Cited

U.S. PATENT DOCUMENTS

| | | | | |
|---|---|---|---|---|
| 6,947,987 B2* | 9/2005 | Boland | ................. | G06F 9/5016 709/226 |
| 7,051,188 B1* | 5/2006 | Kubala | ................. | G06F 9/5077 712/29 |
| 2002/0129204 A1* | 9/2002 | Leighnor | ............. | G06F 3/0611 711/118 |
| 2003/0051021 A1* | 3/2003 | Hirschfeld | ............ | G06F 9/5077 709/223 |
| 2004/0215792 A1* | 10/2004 | Koning | ................... | G06F 9/505 709/229 |
| 2008/0270674 A1* | 10/2008 | Ginzton | .............. | G06F 9/45533 711/6 |

* cited by examiner

Primary Examiner — Mark A Giardino, Jr.
(74) Attorney, Agent, or Firm — JCIPRNET (57) ABSTRACT

The present invention relates to an operation method of distributed memory disk cluster storage system, a distributed memory storage system is adopted thereby satisfying four desired improvements including the expansion of network bandwidth, the expansion of hard disk capacity, the increasing of IOPS speed, and the increasing of memory I/O transmitting speed. Meanwhile, the system can be cross-region, cross-datacenter and cross-WAN operated, so the user's requirements can be collected through the local memory disk cluster for providing the corresponding services, the capacity of the memory disk cluster can also be gradually expanded for further providing cross-region or cross-country data service.

22 Claims, 2 Drawing Sheets

OPERATION METHOD OF DISTRIBUTED MEMORY DISK CLUSTER STORAGE SYSTEM

BACKGROUND OF THE INVENTION

1. Field of the Invention

The present invention relates to an operation method of distributed memory disk cluster storage system, especially to a network data interchange storage system having features of fast many-to-many transmission, high expandability and stable performance.

2. Description of Related Art

In recent years, with the prevalence of network application and the increasing network communication required by mobile devices, the company information system has been being developed for meeting the fast growing demand. The requirement for computer resources has never been so high, and with the boosting amount of users accessing the network at the same time, the current storage equipment is unable to satisfy the connection and bandwidth required by such enormous amount of users.

In the hardware system of a conventional network processing server, the electronic data has to utilize a network as a bridge for being transmitted, when the data amount is in the normal lever, the available network transmission capacity is enough to handle, when the data amount is rapidly increased, because the network transmitting rate of the network bridging transmission has its limit, the required processing speed for handling the huge data amount cannot be met regardless how up-to-date the server computer is, so users may face the problems of data delaying or transmission being interrupted when using the network system.

Moreover, with the existed technology, the development of a memory has yet reached the maximum stage, so the storage capacity is very limited and only can be used for temporary storage, thus the conventional server mainframe still adopts a hard disk device for storing data and allowing the main operating system to be installed therein.

Speaking of the data transmission between software and hardware, the data transmitting speed between the process unit and the memory is much higher than the data transmitting speed between the process unit and the hardware, in other words, utilizing the hard disk equipment as the main storage space for the purpose of computing is the main reason why the optimal processing performance cannot be achieved, such situation would only get worse when processing large amounts of data; moreover, the service life of the hard disk equipment is way shorter than the service life of the memory, so adopting the hard disk equipment as the main storage means is not the best solution for the whole system.

Based on the above, the prior art could not enable the processor to perform the real processing efficiency when large amount of data is awaiting to be handled; accordingly, the applicant of the present invention has devoted himself for developing and designing an operation method of distributed memory disk cluster storage system for improving the disadvantages existed in prior art.

SUMMARY OF THE INVENTION

In view of the disadvantages existing in the prior art, the present invention provides an operation method of distributed memory disk cluster storage system for overcoming the above-mentioned disadvantages.

Accordingly, the present invention provides an operation method of distributed memory disk cluster storage system, characterized in that: firstly the installation of a distributed memory storage equipment includes a plurality of computer units for assembling a cluster scheme so as to form a cluster memory disk; the computer unit is installed with a virtual machine platform, so the computer unit is formed with a plurality of virtual machines, and the computer unit is used for setting the memory capacity occupying means through the virtual machine operating system or a program software, so the memory is able to be planed as a storage device thereby forming as a plurality of chunk memory disks; a file is divided into one or plural data, one or plural copies are evenly distributed in the chunk memory disk, a memory bus with multiple channels is utilized for parallel accessing the memory module thereby allowing the capacity of the memory module to be planned for being used as a hard disk, wherein the access of the memory module supports all the file formats of the virtual machine operating system, and a distributed storage scheme is utilized for allowing the data to be copied to one or more copies; when the virtual machine operating system of the virtual machine directly accesses the required file through the CPU, the processed data is stored in the memory module, the memory used by the virtual machine for computing is also in the memory module, the computed data is directly stored in the original location of the memory module of the virtual machine operating system, so most of the data in the computer unit is able to be processed in the chunk memory disk with a parallel computing manner; the data which is not in the computer unit accesses the chunk memory disk of other computer unit through a network card being connected to a connection port cluster link; with respect to the assigned functions, each of the computer units is categorized to a first data center, at least a second data center and a backup center; wherein the first data center is provided with a virtual cluster data control station for controlling, wherein each of the second data centers is provided with a virtual cluster data backup station for controlling, and the backup center is provided with a virtual cluster data backup station for controlling, wherein the first data center and the second data center together form a distributed memory file system; moreover, a stack scheme is provided for expanding the storage capacity scheme, the access means of a network layer interface is utilized to plan the plural chunk memory disks of a computer unit to a resource pool of cluster memory disk unit with a cluster concept, and all the chunk memory disks are enabled to be synchronously operated for accessing data; when the cluster schemes are formed, each of the cluster schemes is able to be independently operated, and each of the cluster schemes is able to be served as a distributed memory disk cluster storage, the network layer interface is used for stacking, each of the distributed memory disk cluster storages is able to be used for simulating a chunk memory disk, a new cluster data control station and a new cluster data backup station are provided for controlling the amount of processed data to be distributed in all the chunk memory disks.

Wherein, each of the chunk memory disks is respectively and electrically connected to at least a hard disk storage device, the hard disk storage device is served to backup the data in the chunk memory disk in every preset period of time.

Wherein, the chunk memory disks of all the computer units use the continuous data protector for constantly and continuously backup the data to a common large-scale hard disk cluster array for the purpose of back up.

Wherein, the computer unit is installed with a CPU, at least a memory, at least a hard disk, at least a network card, a mother board, an I/O interface card, at least a connection cable and a housing.

Wherein, each copied data is encrypted through mixing the 1-4096 bit AES and RSA for being stored in the memory, when the data is desired to be accessed, the data is transmitted between the memory and the CPU, the virtual machine is formed as a file format for being stored in the memory module, the memory capacity planned for the virtual memory is also in the same sector.

Wherein, each of the chunk memory disks is provided with a monitor unit for monitoring the operation status, the detection unit adopts the Splunk or any software provided by other search engine for the purpose of monitoring, when a problem is detected, a service of restarting application software can be provided thereby achieving a recovery function.

Wherein, the virtual machine platform can be VMware vSphere ESXi 4.1 or later version, Microsoft Server 2012 R2 Hyper-V or later version, Citrix XenServer Oracle VM, Oeacle VM, Red Hat KVM, Red Hat Control groups (croups), Red Hat Linux Containers (LXC), KVM, *Eucalyptus*, OpenStack, User Mode Linux, LXC, OpenVZ, OpenNebula, Enomaly's Elastic Computing, OpenFlow, or Linux-Base KVM; and the virtual machine operating system can be Linux (Linux 2.6.14 and up have FUSE Support included in the official kernel), FreeBSD, OpenSolaris or MacOS X.

Wherein, the memory of the virtual machine is operated through the storage area network, a network layer interface virtualized by a software is adopted for connecting all the chunk memory disks so as to be jointly operated.

Wherein, the network layer interface adopts the SAN, SAN iSCSI, SAN FC, SAN FCoE, NFS, NAS, JBOD, CIFS or FUSE interface for communicating with the server and the disk driver, and the RAMSTORAGE™ API is provided and served as a backup program; wherein the RAMSTORAGE™ API adopts the REST, Restful, C++, PHP, Python, Java, Perl, Javascript and other program developing software for forming the RAMSTORAGE™ API, and the API function of the distributed memory disk cluster storage includes tolerance, backup, shift, rapidly layout virtual machine, managing disk size, automatically increasing the chunk memory disks according to the actual needs, balancing the data loading between chunks, backup recovery, continuous back protector, rapid capture and monitoring resource.

Wherein, the CPU, the memory and the physical hard disk which are not in use can be integrated as a common resource pool through the virtual machine platform, and each required computer resource can be automatically adjusted and transmitted to other computer unit having richer resource.

Wherein, the connecting manner of the plural distributed memory disk cluster storagecan be according to the physical internet transmission protocol, and the packages can be transmitted through SSL, VPN or encryption computing manner; when the network connection is unable to be established, each region is able to be independently operated, when the connection is recovered, the data can be fully synchronized to each of the chunk memory disks of each of the distributed memory disk cluster storages.

Wherein, the CPU is selected from x86, x86-64, IA-64, Alpha, ARM, SPARC 32 and 64, PowerPC, MIPS and Tilera.

Wherein, the operating manner of the memory installed in the computer unit is to directly utilize the memory controller of the CPU to directly access the memory data with a manner of three-channel or multiple-channel and a speed of 800 MHz to 1,333 MHz or higher.

Wherein, the memory capacity is 1 MB to 16 ZB, and the adopted memory type can be a dynamic random access memory (DRAM), a synchronous dynamic memory (DRAM), a dynamic mobile platform memory, a dynamic graphic process memory, a dynamic Rambus memory, a static random access memory (SRAM), a read-only memory (ROM), a Magnetoresistive random-access memory or a flash memory.

Wherein, the dynamic random access memory (DRAM) is FPM RAM or EDO RAM; the synchronous dynamic memory (DRA) is SDRAM, DDR SDRAM, DDR2 SDRAM, DDRS SDRAM, DDR4 SDRAM or DDR5 SDRAM; the dynamic mobile platform memory is LPDDR, LPDDR2, LPDDR3 or LPDDR4; the dynamic graphic process memory is VRAM, WRAM, MDRAM, SGRAM, SDRAM, GDDR, GDDR2, GDDR3, GDDR4, GDDR5, GDDR6 or GDDR7; and other upward compatible types having higher access seed or different access manner; or a Magnetoresistive random-access memory such as MRAM and other upward compatible types having higher access seed or different access manner; or a Ferroelectric RAM such as FeRAM and other upward compatible types having higher access seed or different access manner; or a Phase change Random Access Memory such as PC RAM and other upward compatible types having higher access seed or different access manner; or a Resistive random-access memory such as ReRAM and other upward compatible types having higher access seed or different access manner; the dynamic Rambus memory is RDRAM, XDR DRAM or XDR2 DRAM; and the flash memory is MOR Flash, NAND Flash, 3D NAND Flash, V-Flash, SLC, MLC, eMMC or TLC.

Wherein, the hard disk storage device is a conventional disk head, a floppy-disk drive, solid state drive, internet drive, SAS drive, SATA drive, mSATA drive, PCIe drive, FC drive, SCSI drive, ATA drive, NAND Flash card, FCoE drive.

Wherein, the network card is an Ethernet, fast Ethernet, gigabit Ethernet, glass fiber, token ring network, InfiniBand, FCoE (fiber channel over Ethernet) or wireless network.

Wherein, the network speed is 2 Mbit/s, 10 Mbit/s, 11 Mbit/s, 40 Mbit/s, 54 Mbit/s, 80 Mbit/s, 100 Mbit/s, 150 Mbit/s, 300 Mbit/s, 433 Mbit/s, 1,000 Mbit/s, 1 Gbit/s, 8 Gbit/s, 10 Gbit/s, 16 Gbit/s, 32 Gbit/s, 40 Gbit/s, 56 Gbit/s, 100 Gbit/s, 160 Gbit/s, 1,000 Gbit/s.

Wherein, the mother board is compatible with the x86, x86-64, IA-64, Alpha, ARM, SPARC 32 and 64, PowerPC, MIPS and Tilera processer.

Wherein, the file format of the virtual machine operating system is VMFS3, VMFS5 and other upward compatible types having different format, VHD and other upward compatible types having different format, VHDX and other upward compatible types having different format, VMDK and other upward compatible types having different format, HDFS and other upward compatible types having different format, Isilon OneFS and other upward compatible type having different format, any format generated through memory-type pagefile and other upward compatible types having different format, VEs and other upward compatible types having different format, VPSs and other upward compatible types having different format, CePH, GlusterFS, SphereFS, Taobao File System, ZFS, SDFS, MooseFS, AdvFS, Be file system (BFS), Btrfs, Coda, CrossDOS, disk file system (DFS), Episode, EFS, exFAT, ext, FAT, global file system (GFS), hierarchical file system (HFS), HFS Plus, high performance file system, IBM general parallel file system, JFS, Macintosh file system, MI1MIX, NetWare file system, NILFS, Novell storage service, NTFS, QFS, QNX4FS, ReiserFS (Reiser4), SpadFS, UBIFS, Unix file system, Veritas file system (VxFS), VFAT, write anywhere file layout (WAFL), XFS, Xsan, ZFS, CHFS, FFS2, F2FS, JFFS, JFFS2, LogFS, NVFS, YAFFS, UBIFS, DCE/DFS, MFS, CXFS, GFS2, Google file system, OCFS, OCFS2, QFS, Xsan, AFS, OpenAFS, AFP, MS-DFS, GPFS, Lustre, NCP, NFS, POHMELFS, Hadoop, HAMMER, SMB (CIFS), cramfs, FUSE, SquashFS, UMSDOS, UnionFS, conflgfs, devfs, proofs, specfs, sysfs, tmpfs, WinFS, EncFS, EFS, ZFS, RAW, ASM, LVM, SFS, MPFS or MGFS.

According to the operation method of distributed memory disk cluster storage system provided by the present invention, the distributed memory storage system can satisfy four desired expansions which are the expansion of network bandwidth, the expansion of hard disk capacity, the expansion of IOPS speed, and the expansion of memory I/O transmitting speed. Meanwhile, the system can be cross-region operated, data center and WAN, so the user's requirements can be collected through the local memory disk cluster for being provided with the corresponding services, the capacity of the memory disk cluster can also be gradually expanded for further providing cross-region or cross-country data service.

With the increased quantity of the storage devices, increasing one server would have the network bandwidth and the disk capacity being correspondingly accumulated thereby forming a resource pool, the distributed memory disk cluster storage is served like a physical hard disk, so the whole operation would not be affected due to one of the physical mainframes being failed, the chunk memory disk in the copy could copy the stored data to a new chunk memory disk, so a fundamental data backup is maintained, meanwhile the continuous data protector (CDP) is also adopted for providing novel service of data backup and recovery, thus the disadvantages of the tape backup often being failed and the backup only being performed once a day are improved.

In addition, the data generated through the copy can be sent from different chunk memory disk thereby achieving many-to-one data transmission, when the user amount increases, only increasing the quantity of the chunk memory disk can achieve the many-to-many transmission, so the disadvantages of the multiple RAID hard disks crashing causing the whole data being missed, the limitation of the quantity of network interface of storage device and the network speed causing the excessive data being overly jammed and delayed for transmitting, the expansion of LUN and the data center being unable to be cross-region operated can be solved; the present invention adopts the memory being served as a disk, each file or each virtual machine can be stored in the memory with a file format, the highest i/O speed of the memory bus can be directly 15 utilized, the data can be transmitted between the CPU and the memory, the highest I/O number, distance and speed can be provided. Accordingly, the present invention is novel and more practical in use comparing to prior art.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
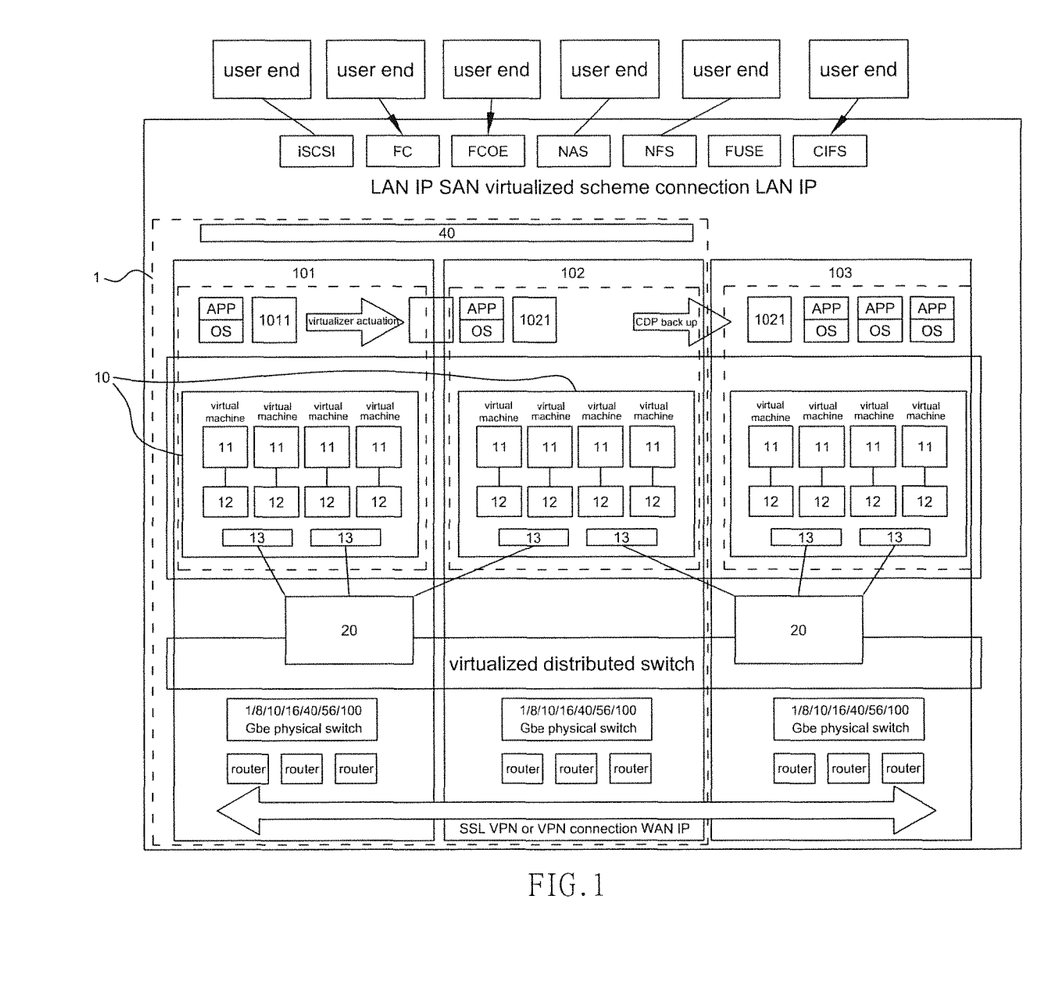
FIG. 1 is a schematic view illustrating the operation method of distributed memory disk cluster storage system according to one embodiment provided by the present invention.

Referring from FIG. 1, the present invention provides an operation method of distributed memory disk cluster storage system, wherein one preferred embodiment for illustrating the operation method of distributed memory disk cluster storage system is as following:

The installation of a distributed memory storage equipment includes a plurality of computer units (10) for assembling a cluster scheme (1) so as to form a cluster memory disk; wherein the computer unit (10) is installed with a CPU, at least a memory, at least a hard disk, at least a network card, a mother board, an I/O interface card, at least a connection cable and a housing.

The computer unit (10) is installed with a virtual machine platform, so the computer unit (10) is formed with a plurality of virtual machines, and the computer unit (10) is used for setting the required machine memory resource capacity, the virtual machine operating system is used for setting the memory capacity occupying manner, or a program software is utilized for planning the memory to a hard disk device for forming as a chunk memory disk (11) which is the same as the tracks of a hard disk.

As such, a file is enabled to be divided into one or plural data, and the file size can be 64 MB or bigger, one or plural copies are evenly distributed in the chunk memory disk (11), so the data is actually stored in a memory module, and a memory bus with multiple channels is utilized for parallel accessing the memory module thereby allowing the capacity of the memory module to be planned for being used as a hard disk, wherein the access of the memory module supports all the file formats of the virtual machine operating system, and a distributed storage scheme is utilized for allowing the data to be copied to one or more copies, with the above-mentioned method, the data center can still be operated even if the machine is broken and/or the data center is damaged.

Each copied data can be encrypted through mixing the 1-4096 bit AES and RSA for being stored in the memory, when the data is desired to be accessed, the data is transmitted between the memory and the CPU thereby minimizing the I/O accessing times and distance, the virtual machine is formed as a file format for being stored in the memory module, the memory capacity planned for the virtual memory is also in the same sector.

When the virtual machine operating system of the virtual machine directly accesses the required file through the CPU, the processed data is stored in the memory module, the memory required by the virtual machine for computing is also in the memory module, the computed data is directly stored in the original location of the memory module of the virtual machine operating system; with the reduced access path and the fastest I/O speed, the storage system provided by the present invention allows most of the data in the computer unit (10) to be processed in the chunk memory disk (11) with a parallel computing manner, the data which is not in the computer unit (10) accesses the chunk memory disk (11) of other computer unit (10) through a network card (13) being connected to a connection port cluster link (20).

Wherein, the virtual machine platform can be VMware vSphere ESXi 4.1 or later version, Microsoft Server 2012 R2 Hyper-V or later version, Citrix XenServer Oracle VM, Oeacle VM, Red Hat KVM, Red Hat Control groups (cgroups), Red Hat Linux Containers (LXC), KVM, *Eucalyptus*, OpenStack, User Mode Linux, LXC, OpenVZ, OpenNebula, Enomaly's Elastic Computing, OpenFlow, or Linux-Base KVM; and the virtual machine operation operating system can be Linux (Linux 2.6.14 and up have FUSE Support included in the official kernel), FreeBSD, OpenSolaris or MacOS X.

Moreover, each of the chunk memory disks (11) can be provided with a monitor unit for monitoring the operation status, the detection unit can adopt the Splunk or any software provided by other search engine for the purpose of monitoring, when a problem is detected, a service of restarting application software can be provided thereby achieving a recovery function, the mentioned program is prior art therefore no further illustration is provided.

With respect to the assigned functions, each of the computer units (10) can be categorized to a first data center (101), at least a second data center (102) and a backup center (103); wherein the first data center (101) is provided with a virtual cluster data control station (1011) for controlling, wherein each of the second data centers (102) is provided with a virtual cluster data backup station (1021) for controlling, and the backup center (103) is provided with a virtual cluster data backup station (1021) for controlling, wherein the first data center (101) and the second data center (102) jointly form a distributed memory file system (40).

Figure 2:
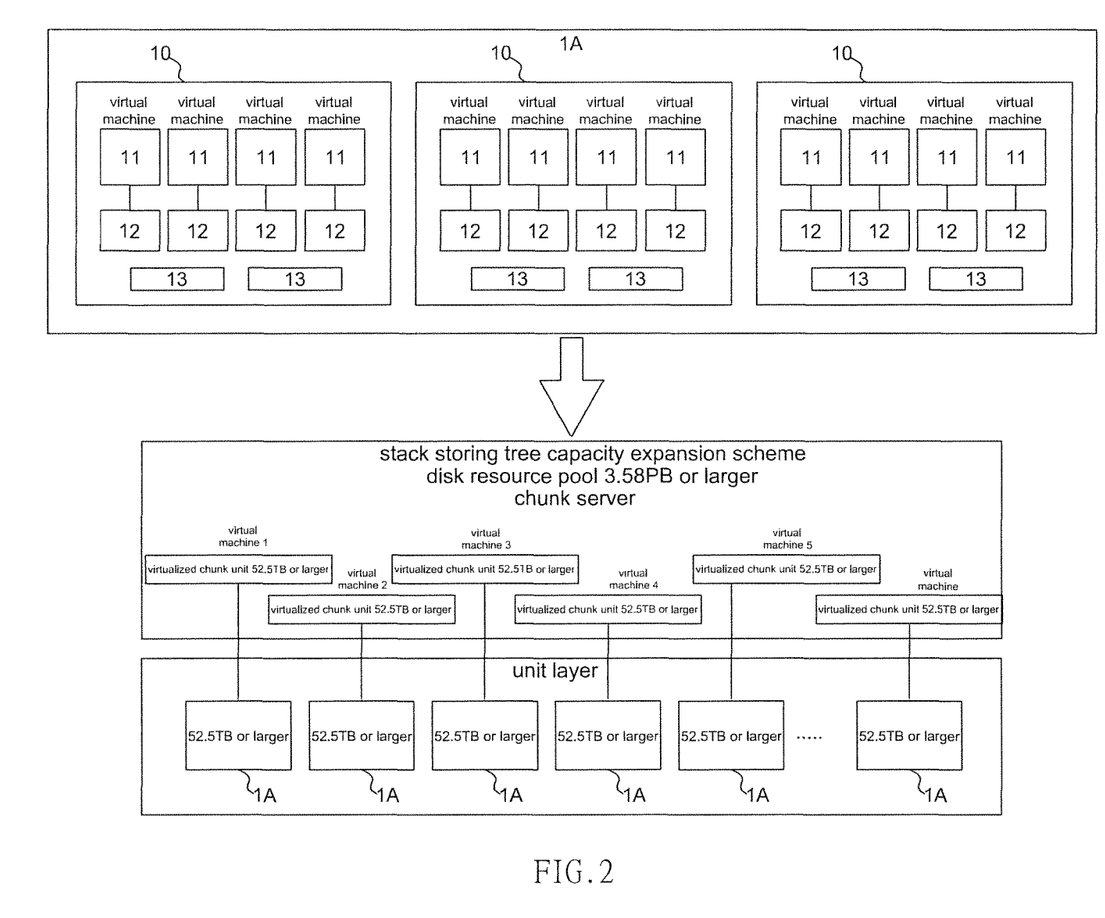
FIG. 2 is another schematic view illustrating the operation method of distributed memory disk cluster storage system according to one embodiment provided by the present invention.

Referring to FIG. 2, a stack scheme is provided for expanding the storage capacity scheme, the access means of a network layer interface is utilized to plan the plural chunk memory disks (11) of a computer unit (10) to a resource pool of cluster memory disk unit with a cluster concept, the operating theory is the same as that of the bus of the computer.

When the 64 bit chunk memory disks (11) of the plural computer units (10) are adopted, the operation is the same as the 64 bit CPU bus for synchronously using all the chunk memory disks (11) for accessing data; when the quantity of the chunk memory disks (11) is expanded, the operation is the same as upgrading the 64 bit CPU bus to 128 bit or 256 bit, the access speed is increased with an accumulating manner, so the memory disk capacity can be increased through the quantity of chunk memory disk (11) being increased, the limitation of the disk capacity can be increased, and the data access speed and the data liability can also be increased, and the above-mentioned can be gradually increased according to the user's desire.

When the cluster schemes (1) are formed, each of the cluster schemes can be independently operated, and each of the cluster schemes (1) can be used as a distributed memory disk cluster storage (DMDCS) (1A), the network layer interface is used for stacking, so each of the distributed memory disk cluster storages (1A) can be used for simulating a chunk memory disk, a new cluster data control station (1011) and a new cluster data backup station (1021) are provided for controlling the amount of processed data to be distributed in all the chunk memory disks.

Accordingly, the above-mentioned is the same as utilizing the resource of each mainframe for parallel computing, the data is divided into blocks for being transmitted to each machine for computing, then eventually integrated to a final result.

When one of the chunk memory disks (11) is failed or one of the distributed memory disk cluster storages (1A) is failed, the operation of the whole disk is not affected and the whole disk is prevented from being totally crashed.

Moreover, when the memory of one of the computer units (10) is failed, the server computer unit marks the damaged memory as malfunction, and the chunk memory IC of the DIMM memory is no longer in use, the resource would only be used again after the memory is replaced.

The memory of the virtual machine is operated through a storage area network (SAN), a network layer interface virtualized by a software is adopted for connecting all the chunk memory disks so as to be jointly operated; the network layer interface adopts SAN, SAN iSCSI, SAN FC, SAN FCoE, NFS, NAS, JBOD, CIFS, FUSE interface for communicating with the server and the disk driver, and the RAMSTORAGE™ API is provided and served as a backup program.

Wherein the RAMSTORAGE™ API adopts REST, Restful, C++, PHP, Python, Java, Perl, Javascript and other program developing software for forming the RAMSTORAGE™ API, and the API function of the distributed memory disk cluster storage (1A) includes tolerance, backup, shift, rapidly layout virtual machine, planningdisk size, automatically increasing the chunk memory disks (11) according to the actual needs, balancing the data loading between chunks, backup recovery, continuous back protector (CDP), rapid capture and monitoring resource.

In addition, each of the chunk memory disks (11) is respectively and electrically connected to at least a hard disk storage device (12), the hard disk storage device (12) is served to backup the data in the chunk memory disk (11) in every preset period of time thereby avoiding any unanticipated malfunction, for example in every minute, the altered portion of certain data in each of the chunk memory disks (11) is copied to the hard disk storage device (12) for the purpose of data backup.

When each of the chunk memory disks (11) restarts, the last backup data stored in the hard disk storage device (12) would be fully recovered to the chunk memory disk (11), and the cluster data control station (1011) is informed for joining the cluster operation.

All the chunk memory disks (11) of all the computer units (10) use the continuous data protector (CDP) for constantly and continuously backup the data to a common large-scale hard disk cluster array for the purpose of back up, when a part of the server computer units or a part of the chunk memory disks (11) is failed due to environmental or other factors, the virtual machine can be recovered according to the required timing for finding the captured backup or a certain recovery timing, the mentioned large-scale hard disk is the mentioned backup center (103), of course the cluster disk array can adopt the conventional magnetic tape for providing a third backup.

Each of the chunk memory disks (11) is able to plan the required capacity and the CPU resource with an automatic layout manner, the network layer interface can also be served to automatically set up the required IP and MAC address, and the virtual machine can be set with the AP according to the actual needs and the required conditions can be automatically assigned.

Moreover, the CPU, the memory and the physical hard disk which are not in use can be integrated as a common resource pool through the virtual machine platform operation system, and each required computer resource can be automatically adjusted and transmitted to other computer unit (10) with richer resource.

The connecting manner of the plural distributed memory disk cluster storages (1A) can be according to the physical internet transmission protocol, and the packages can be transmitted through SSL, VPN or encryption computing manner, and can be operated with a means of cross-region, cross-country and WAN IP; when the network connection is unable to be established, each region is able to be independently operated. When the connection is recovered, the data can be fully synchronized to each of the chunk memory disks (11) of each of the distributed memory disk cluster storages (1A).

According to one embodiment of the present invention, the CPU is selected from x86, x86-64, IA-64, Alpha, ARM, SPARC 32 and 64, PowerPC, MIPS and Tilera.

The operating manner of the memory installed in the computer unit (10) is to directly utilize the memory controller of the CPU to directly access the memory data with a manner of three-channel or multiple-channel and a speed of 800 MHz to 1,333 MHz or higher.

The capacity of single memory is 1 MB (megabyte) to 16 ZB (zettabyte), the adopted memory type can be a dynamic random access memory (DRAM) such as FPM RAM, EDO RAM; or a synchronous dynamic memory (DRAM) such as SDRAM, DDR SDRAM, DDR2 SDRAM, DDR3 SDRAM, DDR4 SDRAM, DDR5 SDRAM and other upward compatible types having higher access seed or different access manner; or a dynamic mobile platform memory such as L PDDR LPDDR2, LPDDR3, LPDDR4 and other upward compatible types having higher access seed or different access manner; or a dynamic graphic process memory such as VRAM, WRAM, MDRAM, SGRAM, SDRAM, GDDR GDDR2, GDDR3, GDDR4, GDDR5, GDDR6, GDDR7 and other upward compatible types having higher access seed or different access manner; or a Magnetoresistive random-access memory such as MRAM and other upward compatible types having higher access seed or different access manner; or a Ferroelectric RAM such as FeRAM and other upward compatible types having higher access seed or different access manner; or a Phase change Random Access Memory such as PC RAM and other upward compatible types having higher access seed or different access manner; or a Resistive random-access memory such as ReRAM and other upward compatible types having higher access seed or different access manner; or a dynamic Rambus memory such as RDRAM, XDR DRAM, XDR2 DRAM and other upward compatible types having 15 higher access seed or different access manner; or a static random access memory (SRAM) or a read-only memory (ROM), or a flash memory such as NOR Flash, NAMD Flash, 3D NAND Flash, V-Flash, SLC, MLC; eMMC, TLC and other upward compatible types having higher access seed or different access manner.

The hard disk storage device (12) includes a conventional disk head, a floppy-disk 20 drive, solid state drive, internet drive, SAS drive, SATA drive, mSATA drive, mPCIE PCIe drive, FC drive, SCSI drive, ATA drive, NAND Flash card, FCoE drive and other upward compatible types having higher access seed or different access manner.

The network card can be selected from an Ethernet, fast Ethernet, gigabit Ethernet, glass fiber, token ring network, InfiniBand, FCoE (fiber channel over Ethernet) or wireless network; and with respect to the network protocol, the network speed can adopt 2 Mbit/s, 10 Mbit/s, 11 Mbit/s, 40 Mbit/s, 54 Mbit/s, 80 Mbit/s, 100 Mbit/s, 150 Mbit/s, 300 Mbit/s, 433 Mbit/s, 1,000 Mbit/s, 1 Gbit/s, 8 Gbit/s, 10 Gbit/s, 16 Gbit/s, 32 Gbit/s, 40 Gbit/s, 56 Gbit/s, 100 Gbit/s, 160 Gbit/s and 1,000 Gbit/s or any other network card with new network communication protocol can also be adopted.

The mother board is selected from any mother board compatible with the x86, x86-64, IA-64, Alpha, ARM, SPARC 32 and 64, PowerPC, MIPS andTilera processer and the BeagleBoneBlack or Raspberry Pi mother board made by specific computer manufacturers.

What shall be address is that the file format of the virtual machine operating system can be selected from VN1FS3, VMFS5 and other upward compatible types having different format, VHD and other upward compatible types having different format, VHDX and other upward compatible types having different format, VMDK and other upward compatible types having different format, HDFS and other upward compatible types having different format, Isilon OneFS and other upward compatible types having different format, any format generated through memory-type pagefile and other upward compatible types having different format, VEs and other upward compatible types having different format, VPSs and other upward compatible types having different format, CePH, GlusterFS, SphereFS, 20 Taobao File System, ZFS, SDFS, MooseFS, AdvFS, Be file system (BFS), Btrfs, Coda, CrossDOS, disk file system (DFS), Episode, EFS, exFAT, ext, FAT, global file system (GFS), hierarchical file system (HFS), HFS Plus, high performance file system, IBM general parallel file system, JFS, Macintosh file system, MIMIX, NetWare file system, NILFS, Novell storage service, NTFS, QFS, QNX4FS, ReiserFS (Reiser4), SpadFS, UBIFS, Unix file system, Veritas file system (VxFS), VFAT, write anywhere file layout (WAFL) XFS, Xsan, ZFS CHFS, FFS2, F2FS JFFS JFFS2, LogFS, NVFS, YAFFS, UBIFS, DCE/DFS, MFS, CXFS, GFS2, Google file system, OCFS, OCFS2, QFS, Xsan, 5 AFS, OpenAFS, AFP, MS-DFS, GPFS, Lustre, NCP, NFS, POHMELFS, Hadoop, HAMMER, SMB (CIFS), cramfs, FUSE, SquashFS, UMS-DOS, UnionFS, configfs, devfs, proofs, specfs, sysfs5 tmpfs, WinFS, EncFS, EFS, ZFS, RAW, ASM, LVM, SFS, MPFS or MGFS.

The physical network protocol transferring can be selected from Ethernet, fast Ethernet, gigabit Ethernet, fiber glass, token ring network, SS7, GSM, GPRS, EDGE, HSPA, HSPA+, CDMA, WCDMA, TD-WCDMA, LTE, GSM, cdmaOne, CDMA2000, UMTS WCDMA, TD-SCDMA, WiMAX, 3G broadcast network, CDMA20001X, Wi-Fi, SuperWiFi, Wi-Fi GO and other upward compatible IEEE network transmission protocol.

With the technical breakthrough for the distributed memory disk cluster storage system provided by the present invention, the distributed memory storage system can satisfy four desired expansions which are the expansion of network bandwidth, the expansion of hard disk capacity, the expansion of IOPS speed, and the expansion of memory I/O transmitting speed. Meanwhile, the system can be cross-region operated, data center and WAN, so the user's requirements can be collected through the local memory disk cluster for being provided with the corresponding services, the capacity of the memory disk cluster can also be gradually expanded for further providing cross-region or cross-country data service.

With the increased quantity of the storage devices, increasing one server would have the network bandwidth and the disk capacity being correspondingly aggregated thereby forming a resource pool, the distributed memory disk cluster storage (I A) is served like a physical hard disk, so the whole operation would not be affected due to one of the physical mainframes being failed, the chunk memory disk (11) in the copy could copy the stored data to a new chunk memory disk (11), so a fundamental data backup is maintained, meanwhile the continuous data protector (CDP) is also adopted for providing novel service of data backup and recovery, thus the disadvantages of the tape backup often being failed and the backup only being performed once a day are improved.

In addition, the data generated through the copy can be sent from different chunk memory disk (11) thereby achieving the many-to-one data transmission, when the user amount increases, only increasing the quantity of the chunk memory disk (11) can achieve the many-to-many transmission, so the disadvantages of the multiple RAID hard disks crashing causing the whole data being missed, the limitation of the quantity of network interface of storage device and the network speed causing the excessive data being overly jammed and delayed for transmitting, the expansion of LUN and the data center being unable to be cross-region operated can be solved; the present invention adopts the memory being served as a disk, each file or each virtual machine can be stored in the memory with a file format, the highest I/O speed of the memory bus can be directly utilized, the data can be transmitted between the CPU and the memory, the highest I/O number, distance and speed can be provided. Accordingly, the present invention is novel and more practical in use comparing to prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An operation method of distributed memory disk cluster storage system, characterized in: an installation of distributed memory storage equipment includes a plurality of computer units for assembling a cluster scheme so as to form a cluster memory disk;

one of the plurality of computer units is installed with a virtual machine platform, one of the plurality of computer units is formed to have a plurality of virtual machines, and one of the plurality of computer units is used for setting memory capacity occupying means through the virtual machine operating system or a program software, so a memory is able to be planned as a storage device thereby forming a plurality of chunk memory disks; a file is divided into one or plural data, the one or plural data are evenly distributed in the plurality of chunk memory disks, a memory bus with multiple channels is utilized for parallel accessing a memory module thereby allowing the capacity of the memory module to be planned for being used as a hard disk, wherein the access of the memory module supports all the file formats of the virtual machine operating system, and a distributed storage scheme is utilized for allowing the data to be copied to one or more copies;

when the virtual machine operating system of the virtual machine directly accesses a required file through a CPU, a processed data is stored in the memory module, the memory used by the virtual machine for computing is also in the memory module, a computed data is directly stored in the memory module of the virtual machine operating system, so most of the data in one of the plurality of computer units is able to be processed in the plurality of chunk memory disks with a parallel computing manner; the data which is not in one of the plurality of computer units is accessed by the plurality of chunk memory disks of another computer unit through a network card being connected to a connection port cluster link;

with respect to a plurality of assigned functions, each of the plurality of computer units is categorized to a first data center, at least a second data center and a backup center; wherein the first data center is provided with a virtual cluster data control station for controlling, wherein each of the second data centers is provided with a virtual cluster data backup station for controlling, and the backup center is provided with a virtual cluster data backup station for controlling, wherein the first data center and the second data center together form a distributed memory file system; moreover, a stack scheme is provided for expanding a storage capacity scheme, a plurality of access means of a network layer interface is utilized to plan the plural chunk memory disks of a computer unit to a resource pool of cluster memory disk unit with a cluster concept, and all the plurality of chunk memory disks are enabled to be synchronously operated for accessing data;

when a plurality of cluster schemes are formed, each of the cluster schemes is able to be independently operated, and each of the cluster schemes is able to be served as a distributed memory disk cluster storage, the network layer interface is used for stacking, each of a plurality of distributed memory disk cluster storages is able to be used for simulating a chunk memory disk, a new cluster data control station and a new cluster data backup station are provided for controlling an amount of processed data to be distributed in all the chunk memory disks.

2. The operation method of distributed memory disk cluster storage system according to claim wherein each of the chunk memory disks is respectively and electrically connected to at least a hard disk storage device, the hard disk storage device is served to backup the data in the chunk memory disk once every preset period of time.

3. The operation method of distributed memory disk cluster storage system according to claim 1, wherein the chunk memory disks of all the plurality of computer units use a continuous data protector for constantly and continuously backing up the data to a common large-scale hard disk cluster array for the purpose of back up.

4. The operation method of distributed memory disk cluster storage system according to claim 1, wherein one of the plurality of computer units is installed with a CPU, at least a memory, at least a hard disk, at least a network card, a mother board, an I/O interface card, at least a connection cable and a housing.

5. The operation method of distributed memory disk cluster storage system according to claim 1, wherein each copied data is encrypted through mixing the 1-4096 bit AES and RSA to be stored in the memory, when the data is desired to be accessed, the data is transmitted between the memory and the CPU, the virtual machine is formed as a file format for being stored in a sector of the memory module, a memory capacity planned for the virtual memory is also stored in the sector of the memory module.

6. The operation method of distributed memory disk cluster storage system according to claim 1, wherein each of the chunk memory disks is provided with a monitor unit for monitoring an operation status, the detection unit adopts any software provided by other a search engine for the purpose of monitoring, when a problem is detected, a service of restarting application software is provided thereby achieving a recovery function.

7. The operation method of distributed memory disk cluster storage system according to claim 1, a memory of the virtual machine is operated through a storage area network, a network layer interface virtualized by a software is adopted for connecting all the chunk memory disks so as to be jointly operated.

8. The operation method of distributed memory disk cluster storage system according to claim 1, wherein a CPU, the memory and a physical hard disk which are not in use is integrated as a common resource pool through the virtual machine platform, and each of a plurality of required computer resources is able to be automatically adjusted and transmitted to another computer unit having rich resources.

9. The operation method of distributed memory disk cluster storage system according to claim 1, wherein a connecting manner of a plural distributed memory disk cluster storages is according to a physical internet transmission protocol, and a plurality of packages are able to be transmitted through SSL, VPN or encryption computing manner; when a network connection is unable to be established, each region is able to be independently operated, when the connection is recovered, the data is able to be fully synchronized to each of the chunk memory disks of each of the distributed memory disk cluster storages.

10. The operation method of distributed memory disk cluster storage system according to claim 1, wherein an operating manner of the memory installed in one of the plurality of computer units is to directly utilize the memory controller of the CPU to directly access the memory data with a manner of three-channel or multiple-channel and a speed of 800 MHz to 1,333 MHz or higher.

11. The operation method of distributed memory disk cluster storage system according to claim 10, wherein the memory capacity is 1 MB to 16 ZB.

12. The operation method of distributed memory disk cluster storage system according to claim 10, wherein the adopted memory type is a dynamic random access memory (DRAM), a synchronous dynamic memory (DRAM), a dynamic mobile platform memory, a dynamic graphic process memory, a dynamic Rambus memory, a static random access memory (SRAM), a read-only memory (ROM), a Magnetoresistive random-access memory or a flash memory.

13. The operation method of distributed memory disk cluster storage system according to claim 12, wherein the dynamic random access memory (DRAM) is FPM RAM (Fast Page Mode RAM) or EDO RAM (Extended Data Output RAM).

14. The operation method of distributed memory disk cluster storage system according to claim 12, wherein the synchronous dynamic memory (DRAM) is SDRAM, DDR SDRAM, DDR2 SDRAM, DDR3 SDRAM, DDR4 SDRAM or DDR5 SDRAM.

15. The operation method of distributed memory disk cluster storage system according to claim 12, wherein the dynamic mobile platform memory is LPDDR (Low Power Double Data Rate RAM), LPDDR2, LPDDR3 or LPDDR4.

16. The operation method of distributed memory disk cluster storage system according to claim 12, wherein the dynamic graphic process memory is VRAM (Video RAM), WRAM (Window RAM), MDRAM (Multibank Dynamic RAM), SGRAM (Synchronous Graphics RAM), SDRAM, GDDR (Graphics Double Data Rate RAM), GDDR2, GDDR3, GDDR4, GDDR5 or GDDR6, GDDR7.

17. The operation method of distributed memory disk cluster storage system according to claim 12, wherein the dynamic Rambus memory is RDRAM, XDR DRAM (Extreme Data Rate Dynamic RAM) or XDR2 DRAM.

18. The operation method of distributed memory disk cluster storage system according to claim 12, wherein the flash memory is NOR Flash, NAND Flash, 3D NAND Flash, V-Flash, SLC, MLC, eMMC or TLC.

19. The operation method of distributed memory disk cluster storage system according to claim 12, wherein the Magnetoresistive random-access memory is MRAM.

20. The operation method of distributed memory disk cluster storage system according to claim 12, wherein the hard disk storage device is a conventional disk head, a floppy-disk drive, solid state drive, internet drive, SAS drive, SATA drive, mSATA drive, PCIe drive, FC drive, SCSI drive, ATA drive, NAND Flash card, FCoE (Fibre Channel over Ethernet) drive.

21. The operation method of distributed memory disk cluster storage system according to claim 1, wherein the network card is an Ethernet, fast Ethernet, gigabit Ethernet, glass fiber, token ring network, InfiniBand, FCoE (Fibre Channel over Ethernet) or wireless network.

22. The operation method of distributed memory disk cluster storage system according to claim 21, wherein the network speed is 2 Mbit/s, 10 Mbit/s, 11 Mbit/s, 40 Mbit/s, 54 Mbit/s, 80 Mbit/s, 100 Mbit/s, 150 Mbit/s, 300 Mbit/s, 433 Mbit/s, 1,000 Mbit/s, 1 Gbit/s, 8 Gbit/s, 10 Gbit/s, 16 Gbit/s, 32 Gbit/s, 40 Gbi, 56 Gbit/s, 100 Gbit/s, 160 Gbit/s, 1,000 Gbit/s or higher.

* * * * *

UNITED STATES PATENT AND TRADEMARK OFFICE
CERTIFICATE OF CORRECTION

| | | |
|---|---|---|
| PATENT NO. | : 10,466,912 B2 | Page 1 of 1 |
| APPLICATION NO. | : 14/562892 | |
| DATED | : November 5, 2019 | |
| INVENTOR(S) | : Hsun-Yuan Chen | |

It is certified that error appears in the above-identified patent and that said Letters Patent is hereby corrected as shown below:

In the Specification

At Column 9, Line 62-67, it should read as follows:
The hard disk storage device (12) includes a conventional disk head, a floppy-disk 20 drive, solid state drive, internet drive, SAS drive, SATA drive, mSATA drive, PCIe drive, FC drive, SCSI drive, ATA drive, NAND Flash card, FCoE drive and other upward compatible types having higher access seed or different access manner.

Signed and Sealed this
Seventh Day of January, 2020

Andrei Iancu
*Director of the United States Patent and Trademark Office*